US007951218B2

(12) United States Patent
Oh

(10) Patent No.: US 7,951,218 B2
(45) Date of Patent: May 31, 2011

(54) DUST SEPARATING APPARATUS OF VACUUM CLEANER

(75) Inventor: Jang-Keun Oh, Gwangju (KR)

(73) Assignee: Samsung Gwangju Electronics Co., Ltd., Gwangju (KR)

(*) Notice: Subject to any disclaimer, the term of this patent is extended or adjusted under 35 U.S.C. 154(b) by 0 days.

(21) Appl. No.: 12/690,444

(22) Filed: Jan. 20, 2010

(65) Prior Publication Data

US 2010/0205917 A1 Aug. 19, 2010

Related U.S. Application Data

(60) Provisional application No. 61/152,843, filed on Feb. 16, 2009.

(30) Foreign Application Priority Data

Apr. 22, 2009 (KR) ................................ 2009-35035

(51) Int. Cl.
*B01D 45/00* (2006.01)

(52) U.S. Cl. ............ 55/343; 55/429; 55/459.2; 55/426; 55/DIG. 3; 15/352; 15/353

(58) Field of Classification Search .................... 55/343, 55/424, 426, 428, 429, 523, 459.2, DIG. 3; 15/352, 353
See application file for complete search history.

(56) References Cited

U.S. PATENT DOCUMENTS 6,436,160 B1 * 8/2002 Stephens et al. ................ 55/337
6,596,047 B2 * 7/2003 Oh ................................ 55/426
6,660,053 B2 * 12/2003 Oh et al. ......................... 55/337
6,735,817 B2 5/2004 Bair et al.
6,968,596 B2 * 11/2005 Oh et al. ......................... 15/353
7,097,680 B2 * 8/2006 Oh ................................ 55/343
7,326,268 B2 * 2/2008 Oh et al. ......................... 55/343
7,410,516 B2 * 8/2008 Ivarsson et al. ................. 55/337
7,462,212 B2 * 12/2008 Han et al. ........................ 55/343
7,473,289 B2 * 1/2009 Oh et al. ......................... 55/318
7,488,362 B2 * 2/2009 Jeong et al. ..................... 55/337
7,494,523 B2 * 2/2009 Oh et al. ......................... 55/343
(Continued)

FOREIGN PATENT DOCUMENTS

EP 2085011 8/2009
(Continued)

OTHER PUBLICATIONS

Extended European Search Report dated Jun. 23, 2010 corresponding to European Patent Application No. 10250248.1.

*Primary Examiner* — Jason M Greene
*Assistant Examiner* — Dung Bui
(74) *Attorney, Agent, or Firm* — Ohlandt, Greeley, Ruggiero & Perle, LLP

(57) ABSTRACT

A dust separating apparatus of a vacuum cleaner is disclosed. The dust separating apparatus includes a body unit to separate dust from air and to store the dust separated from the air, a cover unit detachably coupled with the body unit and having an air discharging part with an inlet projected into the body unit, and a horizontal movement-permitting part formed in the body unit to prevent the body unit from colliding with the air discharging part when one of the body unit and the cover unit is moved in a horizontal direction with respect to the other.

20 Claims, 7 Drawing Sheets

U.S. PATENT DOCUMENTS

| | | | | |
|---|---|---|---|---|
| 7,534,279 | B2 * | 5/2009 | Oh et al. | 55/343 |
| 7,537,625 | B2 * | 5/2009 | Han et al. | 55/343 |
| 7,556,662 | B2 * | 7/2009 | Lee et al. | 55/345 |
| 7,615,089 | B2 * | 11/2009 | Oh | 55/337 |
| 7,628,833 | B2 * | 12/2009 | Oh | 55/345 |
| 7,662,201 | B2 * | 2/2010 | Lee | 55/419 |
| 7,682,412 | B2 * | 3/2010 | Oh | 55/345 |
| 7,691,161 | B2 * | 4/2010 | Oh et al. | 55/337 |
| 7,749,296 | B2 * | 7/2010 | Han et al. | 55/429 |
| 7,771,499 | B2 * | 8/2010 | Oh et al. | 55/343 |
| 7,780,752 | B2 * | 8/2010 | Cha et al. | 55/288 |
| 7,789,923 | B2 * | 9/2010 | Oh et al. | 55/343 |
| 7,794,515 | B2 * | 9/2010 | Oh et al. | 55/343 |
| 2005/0252179 | A1 * | 11/2005 | Oh et al. | 55/337 |
| 2008/0190080 | A1 * | 8/2008 | Oh et al. | 55/343 |
| 2009/0193771 | A1 * | 8/2009 | Oh et al. | 55/337 |

FOREIGN PATENT DOCUMENTS

| | | |
|---|---|---|
| JP | 2003088485 | 3/2003 |
| JP | 2003180570 | 7/2003 |
| KR | 1020080066291 | 7/2008 |
| KR | 1020080093607 | 10/2008 |

* cited by examiner

DUST SEPARATING APPARATUS OF VACUUM CLEANER

CROSS-REFERENCE TO RELATED APPLICATIONS

This application claims the benefit under 35 U.S.C. §119 (a) of U.S. Provisional Patent Application No. 61/152,843, filed Feb. 16, 2009, in the United States Patent and Trademark Office, and Korean Patent Application No. 10-2009-0035035, filed on Apr. 22, 2009, in the Korean Intellectual Property Office, the entire contents of both of which are hereby incorporated by reference.

BACKGROUND OF THE INVENTION

1. Field of the Invention

The present disclosure relates to a dust separating apparatus of a vacuum cleaner. More particularly, the present disclosure relates to a dust separating apparatus of a vacuum cleaner, which is capable of allowing one of a body unit and a cover unit to move in a horizontal direction to the other when removing or mounting the dust separating apparatus.

2. Description of the Related Art

In general, a cyclone dust-separating apparatus provided in a vacuum cleaner is an apparatus, which whirls air laden with a dirt or dust (hereinafter, referred as a dust) and separates the dust therefrom. Such a cyclone dust separating apparatus has been recently widely used because it can be semi-permanently used without the inconvenience of frequently replacing dust bags, as in a dust separating apparatus having a dust bag.

The cyclone dust-separating apparatus usually includes a cyclone unit vertically and elongately installed, a cyclone body with an air inflow part and an air discharging part formed at a side and a top thereof, respectively, and a dust collecting unit connected to a bottom part of the cyclone unit. Accordingly, external air laden with dust is drawn in through the side of the cyclone body and ascended while being swirled therein, and the dust that is removed from the air is lowered and collected in the collecting unit.

However, in such a conventional cyclone dust-separating apparatus, there is a problem that since it has one single cyclone to separate the dust from the air only once, a dust separating efficiency is deteriorated.

To address the problem as described above, in recent, a multi cyclone dust-separating apparatus in which a second cyclone unit having a plurality of cyclones is disposed on the first cyclone unit is actively being developed. Such a multi cyclone dust-separating apparatus is advantageous in that since it can separate the dust several times from the air by using the plurality of cyclones, the dust separating efficiency is improved.

However, in the multi cyclone dust-separating apparatus, the first cyclone unit, the dust collecting unit and the second cyclone unit are combined in a body and then installed in a cleaner body. Thus, to dump the dust collected in the dust collecting unit, the entire multi cyclone dust-separating apparatus should be separated from the cleaner body. As a result, it is troublesome to empty the dust collecting unit of the multi cyclone dust-separating apparatus.

In addition, the conventional multi cyclone dust-separating apparatus is configured, so that the air inflow part formed on an outer wall of the first cyclone unit or the dust collecting unit has a vertical surface, which is coupled in contact with a corresponding vertical surface of a dust separating apparatus-connecting part of the cleaner body, to draw in the air from the cleaner body. Thus, if the multi cyclone dust-separating apparatus is unstably arranged or wrongly positioned when installed in the cleaner body, a tight seal may not be maintained between the air inflow part and the dust separating apparatus-connecting part of the cleaner body, which can result in an air leakage therebetween. In this case, an air suction efficiency is deteriorated and as a result, the dust separating efficiency is deteriorated.

SUMMARY OF THE INVENTION

An aspect of the present disclosure is to address at least the above problems and/or disadvantages and to provide at least the advantages described below. Accordingly, an aspect of the present disclosure is to provide a dust separating apparatus of a vacuum cleaner, which is capable of moving one of a body unit and a cover unit in a horizontal direction to the other, thereby allowing the body unit and the cover unit to easily couple to or separate from each other or allowing the body part to easily mount in or separate from a cleaner body.

Another aspect of the present disclosure is to provide a dust separating apparatus of a vacuum cleaner, which is capable of obtaining a tight seal between an air inflow part and a dust separating apparatus-connecting part of a cleaner body even though it is unstably arranged or wrongly positioned when installed in a cleaner body.

In accordance with an aspect of the present disclosure, a dust separating apparatus of a vacuum cleaner includes a body unit to separate a dust from an air and to store the separated dust, a cover unit detachably coupled with the body unit and having an air discharging part with an inlet projected into the body unit, and a horizontal movement-permitting part formed in the body unit to prevent the body unit from colliding with the air discharging part when one of the body unit and the cover unit is moved in a horizontal direction to the other.

The body unit may include at least one first dust separating unit to separate the dust from the air, and a dust collecting bin to store the dust separated from the air at the at least one first dust separating unit. Here, the at least one first dust separating unit may be a single cyclone dust-separating part disposed in the dust collecting bin.

The air discharging part may include a grill member projected into the at least one first dust separating unit when the body unit and the cover unit are coupled with each other.

The horizontal movement-permitting part may include a cutout part formed on an upper part of the body unit in a shape to allow the air discharging part to pass through the upper part of the body unit when the one of the body unit and the cover unit are moved in the horizontal direction. Here, the cover unit may include a projection part formed in a shape to correspond to the cutout part so as to seal the cutout part when the cover unit is coupled with the body unit. Also, the cutout part and the projection part may be formed on rear side walls of the body unit and the cover unit, respectively.

The cover unit may be detachably fixed to a cleaner body, so that the cover unit is maintained in a fixed state in the cleaner body when the body unit is separated and removed from the cover unit.

In addition, the cover unit may further include a second dust separating unit to separate a dust from the air discharged through the air discharging part. Here, the cover unit may include a guide passage to guide the air discharged through the air discharging part into the second dust separating unit. Also, the second dust separating unit may be a multi cyclone dust-separating part disposed on an upper part of the cover part.

The dust collecting bin may include a first dust collecting chamber to store the dust separated at the first dust separating unit, and a second collecting chamber isolated from the first dust collecting chamber by a partition to store the dust separated at the second dust separating unit. Here, the horizontal movement-permitting part may include a first and a second cutout parts formed on the partition and an outer side wall of the dust collecting bin forming the second collecting chamber, respectively, in a shape to allow the air discharging part to pass through the partition and the outer side wall of the dust collecting bin when the one of the body unit and the cover unit are moved in the horizontal direction. Also, the cover unit may include a first and a second projection parts formed on a partition and an outer side wall of the cover unit corresponding to the partition and the outer side wall of the dust collecting bin, in a shape to correspond to the first and the second cutout parts. Here, the partition and the outer side wall of the cover unit and the first and the second projection parts form a dust guide to guide the dust separated at and discharged from the second dust separating unit into the second dust collecting chamber when the dust collecting bin of the body unit is coupled with the cover unit.

A lower part of the cover unit or an upper part of the dust collecting bin may have a first sealing member disposed to seal between the cover unit and the dust collecting bin when the cover unit is coupled with the dust collecting bin.

The dust collecting bin may further include an air inflow part connected to the first dust separating unit while passing through the dust collecting bin and having an end projected outward from an outer wall of the dust collecting bin. The air inflow part may have an inclined edge surface formed at the end thereof. The inclined edge surface may be formed, so that a distance away from the dust collecting bin is gradually increased from an upper part to a lower part thereof Also, the inclined edge surface may have a second sealing member disposed thereon.

BRIEF DESCRIPTION OF THE DRAWING FIGURES

The above and other objects, features, and advantages of certain exemplary embodiments of the present disclosure will be more apparent from the following description taken in conjunction with the accompanying drawings, in which.

Figure 1:
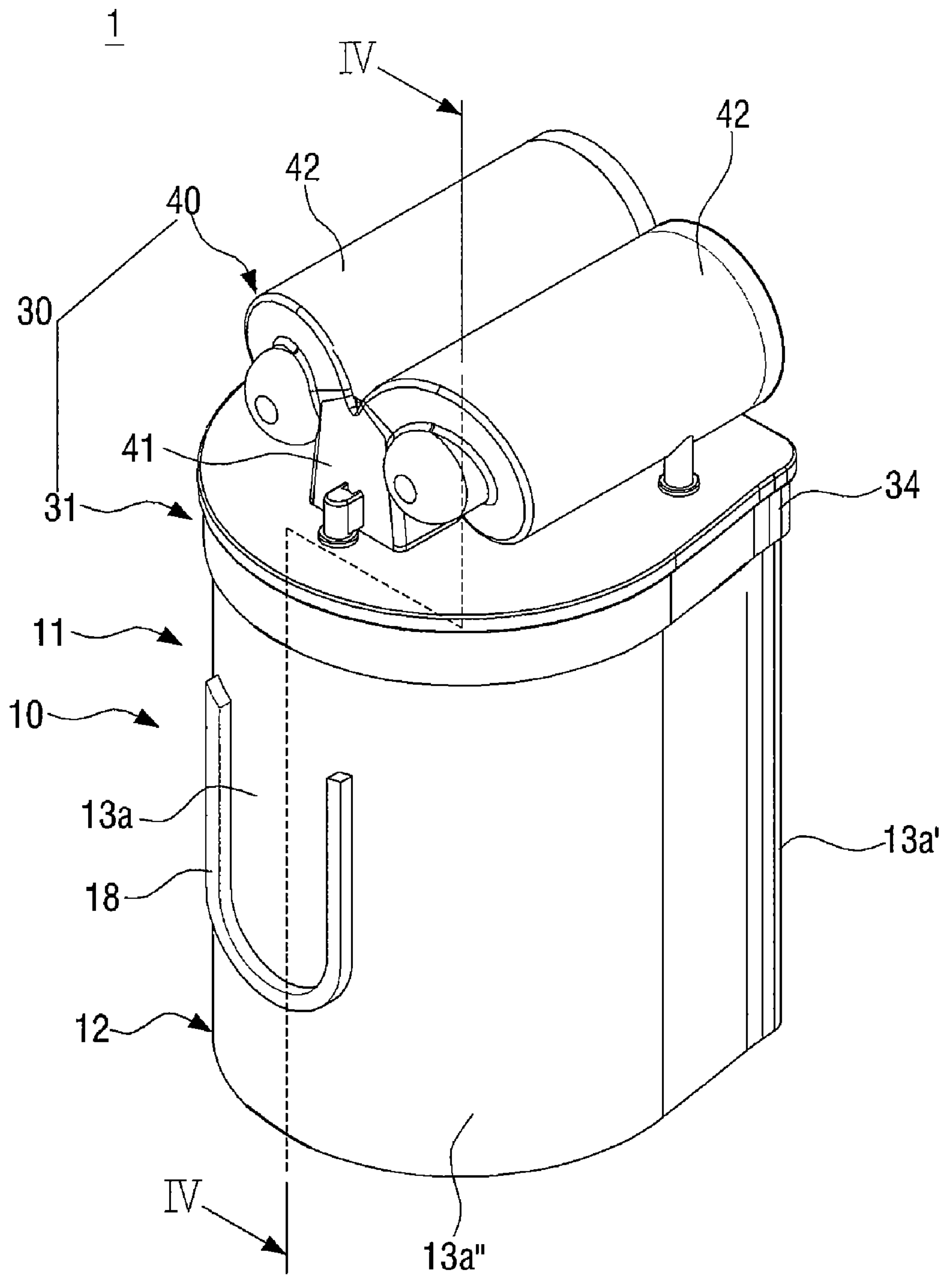
FIG. 1 is a front perspective view exemplifying a dust separating apparatus of a vacuum cleaner according to an exemplary embodiment of the present disclosure.
Figure 5A:
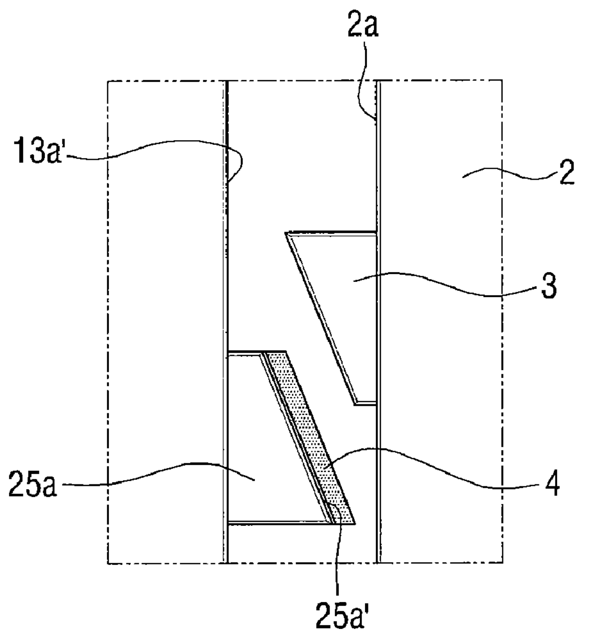
Figure 5B:
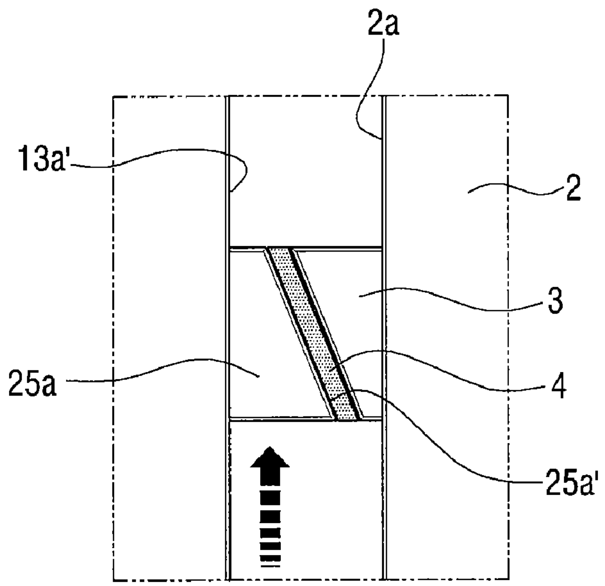
Figure 6A:
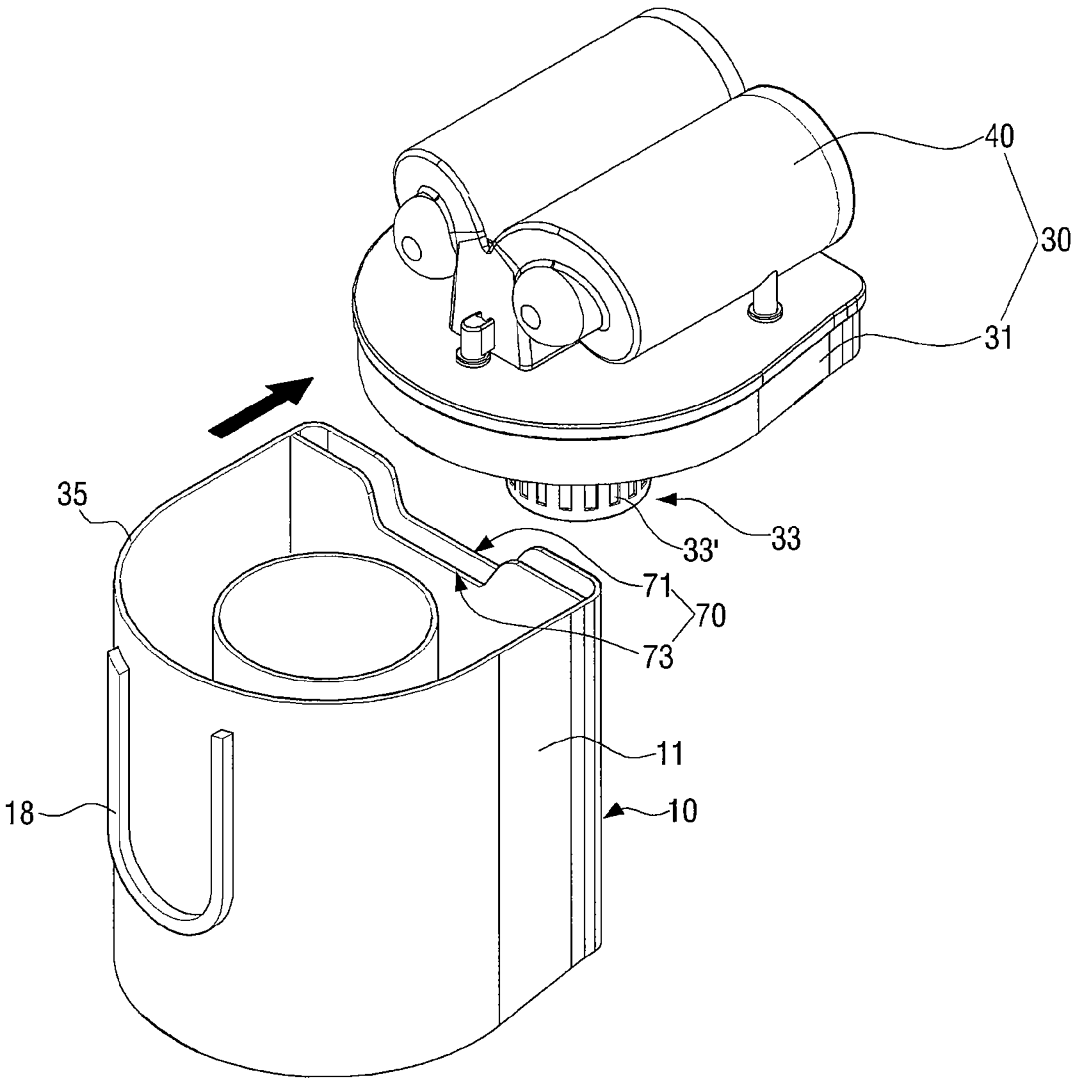
Figure 6B:
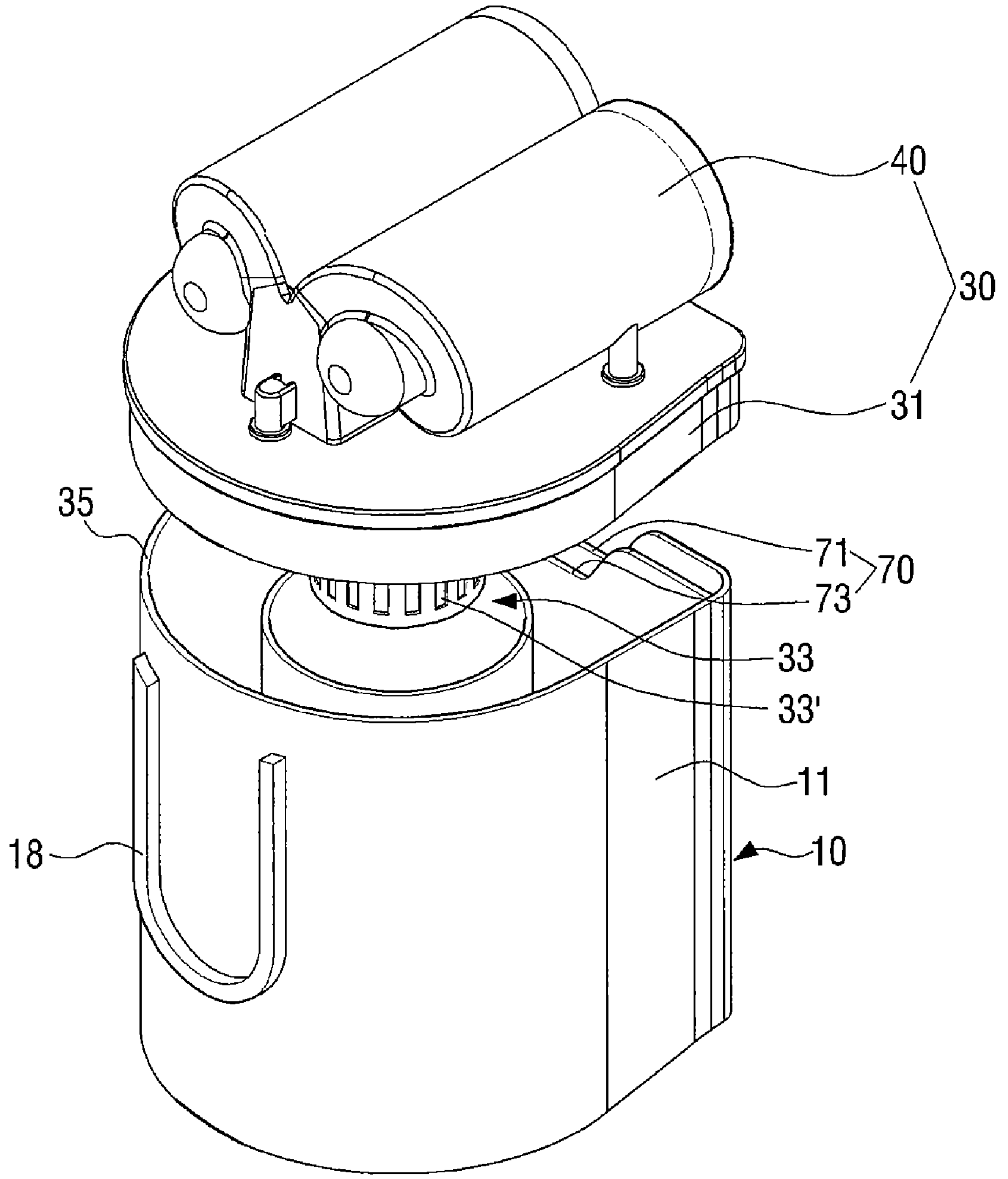

FIGS. 5A and 5B are partial views exemplifying an air inflow part of the dust separating apparatus of FIG. 1 and a dust separating apparatus-connection part of a cleaner body just before and after they are coupled with each other, respectively; and FIGS. 6A and 6B are perspective views exemplifying an operation of coupling a body unit with cover unit of the dust separating apparatus of FIG. 1 when the body unit is mounted in the cleaner body.

Throughout the drawings, the same reference numerals will be understood to refer to the same elements, features, and structures.

DETAILED DESCRIPTION OF THE EXEMPLARY EMBODIMENTS

Hereinafter, a dust separating apparatus of a vacuum cleaner according to certain exemplary embodiments of the present disclosure will be described in detail with reference to the accompanying drawing figures.

FIGS. 1 through 4 schematically exemplify a dust separating apparatus 1 of a vacuum cleaner (not shown) according to an exemplary embodiment of the present disclosure.

Referring to FIGS. 1 through 4, the dust separating apparatus 1 of the vacuum cleaner according to the exemplary embodiment of the present disclosure, as a multi cyclone dust-separating apparatus having a plurality of cyclones, includes a body unit 10, a cover unit 30, and a horizontal movement-permitting part 70.

The body unit 10 includes a dust collecting unit 11 and a first dust separating unit 20.

The dust collecting unit 11 is made up of a dust collecting bin 12 having an approximately D-shaped cross section. The dust collecting bin 12 is provided with an outer bin 13*a* having an open upper part and a partition 13*b* in the form of a rectangle vertically disposed in the outer bin 13*a* to divide an inner space in the outer bin 13*a* into two parts.

A handle 18, which is grasped by a user to move the outer bin 13*a*, is formed on a front side wall 13*a*" of the outer bin 13*a*. The outer bin 13*a* may be formed of a transparent plastic material, so that the user can see from the outside whether or not the dust collecting bin 12 is filled with dust.

The partition 13*b* is disposed adjacent to a rear side wall 13*a*' of the outer bin 13*a* and parallel thereto. The partition 13*b* divides the inner space in the outer bin 13*a* into a first dust collecting chamber 14 and a second dust collecting chamber 15. The first dust collecting chamber 14 is a space, which collects and stores dust first separated by the first dust separating unit 20, and the second dust collecting chamber 15 is a space, which collects and stores dust secondarily separated by a second dust separating unit 40 to be described later.

The first dust separating unit 20 is a single cyclone dust-separating part, which draws in air from a cleaner body 2 (see FIGS. 5A and 5B). The cleaner body 2 draws in air through a suction nozzle assembly (not shown) of the vacuum cleaner (not shown). The first dust separating unit 20 first separates dust from the drawn-in air by a centrifugal force. The first dust separating unit 20 is disposed in the center of the first dust collecting chamber 14 of the outer bin 13*a*. The first dust separating unit 20 is detachably installed on a top of a mounting stage 13 (see FIG. 4) formed on a lower side of the first dust collecting chamber 14, by a coupling means, such as a screw (not shown).

The first dust separating unit 20 is provided with a cylinder 21 having an open upper part and a center pipe 22 in the form of a cylinder formed in the center of the cylinder 21. The first dust separating unit 20 includes, by the cylinder 21 and the center pipe 22, a first dust separating chamber 24 in which dust is first separated from the air that flows into the dust separating apparatus 1 through an air inflow part 25 to be described later. To more smoothly form a whirling air stream or current, a spiral guide 23 is formed in the first dust separating chamber 24.

Figure 2:
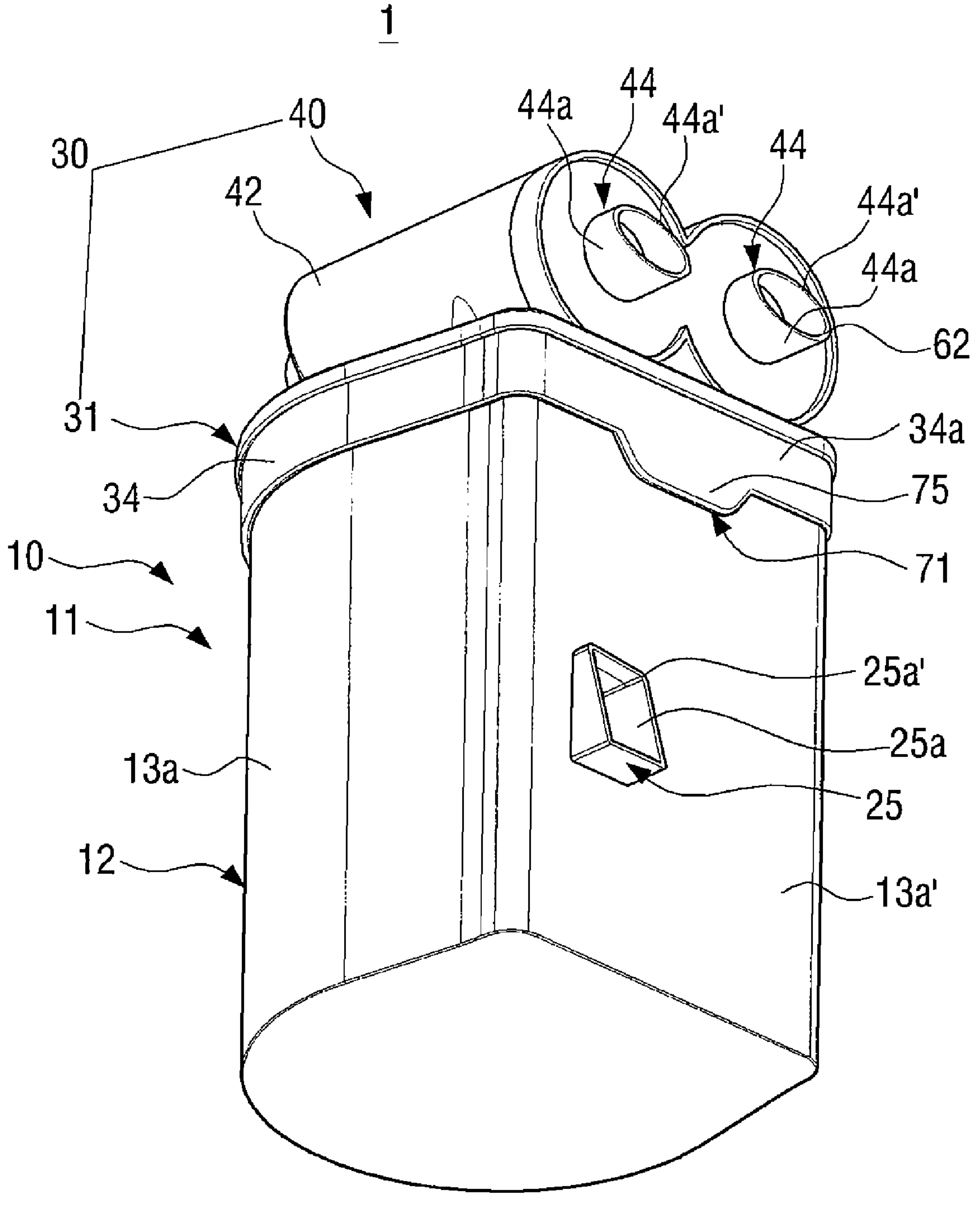
FIG. 2 is a rear perspective of the dust separating apparatus of FIG. 1.
Figure 3:
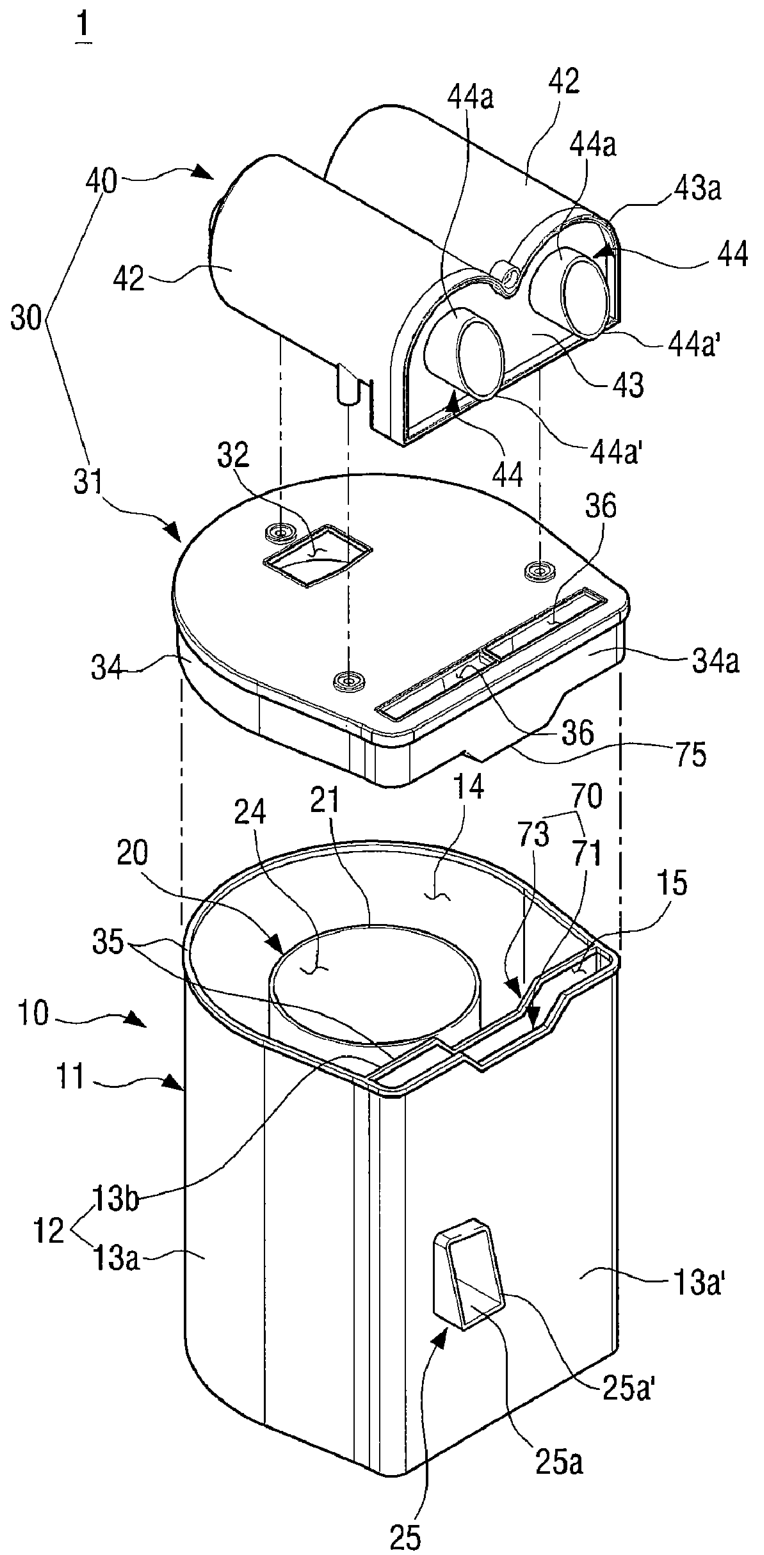
FIG. 3 is a partially exploded perspective view of the dust separating apparatus of FIG. 1.

As shown in FIGS. 2 and 3, the air inflow part 25 is disposed between the rear side wall 13*a*' of the outer bin 13*a* and the cylinder 21 of the first dust separating unit 20. The air inflow part 25 has an inlet 25*a* formed on the side of the rear side wall 13*a*' of the outer bin 13*a*. Accordingly, air flows into a lower side of the cylinder 21 of the first dust separating unit 20 through the inlet 25*a* and ascends while forming the whirling current with the help of the center pipe 22 and the spiral guide 23 in the first dust separating chamber 24. In this process, dust is centrifugally separated from the air and is collected in the first dust collecting chamber 14 through the opened top of the first dust separating chamber 24.

The inlet 25*a* of the air inflow part 25 has an inclined edge surface 25*a*' formed at an end thereof to be slanted to the rear side wall 13*a*' of the outer bin 12*a*. The inclined edge surface 25*a*' may be formed, so that a distance away from the rear side wall 13*a*' is gradually increased from an upper part to a lower part thereof Also, a second sealing member 4 (see FIG. 5A) made of an elastic material is disposed on the inclined edge surface 25*a'*.

The reason why the inlet 25*a* has the inclined edge surface 25*a*' at the end thereof as described above is as follows. In the present embodiment, the body unit 10 has a structure capable of being mounted in and removed from the cleaner body 2 to which the cover unit 30 is fixed. That is, after the body unit 10 is installed in a mounting part 2*a* of the cleaner body 2 (see FIG. 5A), it is lifted to a certain height by a lifting and lowering means (not shown) installed in the cleaner body 2 (see FIG. 5B) as known in the art. With the lifting of the body unit 10, the inlet 25*a* of the air inflow part 25 formed on the rear side wall 13*a*' of the outer bin 13*a* is coupled in close contact with a dust separating apparatus-connecting part 3 formed in the cleaner body 2 with the second sealing member 4 on the inclined edge surface 25*a*' interposed therebetween. Here, the dust separating apparatus-connecting part 3, which transfers the air drawn in into the cleaner body 2 to the inlet 25*a* of the air inflow part 25, takes a shape with an declined edge surface corresponding to the inclined edge surface 25*a*' of the inlet 25*a*. In the present embodiment, the second sealing member 4 is illustrated and explained as being disposed on the inclined edge surface 25*a*', but may be disposed on the corresponding declined edge surface of the dust separating apparatus-connecting part 3. As the inlet 25*a* of the air inflow part 25 and the dust separating apparatus-connecting part 3 of the cleaner body 2 are formed to be slanted as described above, a tight seal can be ensured between the inlet 25*a* and the dust separating apparatus-connecting part 3 and the second sealing member 4 disposed between the inlet 25*a* and the dust separating apparatus-connecting part 3 can be prevented from abnormally slipping off the inclined edge surface 25*a*' by the lifting movement of the inlet 25*a*, when the body unit 10 of the dust separating apparatus 1 is mounted in the cleaner body 2.

The cover unit 30, which opens and closes the upper part of the body unit 10, is detachably fixed in a mounting recess (not shown) of the cleaner body 2 by a fixing means (not shown), such as a screw, and is coupled with the dust collecting bin 12 of the dust collecting unit 11 when the body unit 10 is lifted by the lifting and lowering means after installation in the cleaner body 2, as described above with reference to FIGS. 5A and 5B.

The cover unit 30 includes a cover 31 and a second dust separating unit 40.

The cover 31 is disposed between the second dust separating unit 40 and the dust collecting bin 12 of the dust collecting unit 11. A groove part 33*a* (see FIG. 4) is formed on bottom surfaces of an outer wall 34 and on bottom surfaces of a partition 34*b* of the cover 31. The groove part 33*a* corresponds to top edges of the outer bin 13*a* and the partition 13*b* of the dust collecting bin 12. The top edges of the outer bin 13*a* and the partition 13*b* of the dust collecting bin 12, on which a first sealing member 35 is disposed, are inserted into the groove part 33*a* when the body unit 10 is lifted by the lifting and lowering means after installation in the cleaner body 2, as described above with reference to FIGS. 5A and 5B. Accordingly, the bottom surfaces of the outer wall 34 and the partition 34*b* of the cover 31 and the top edges of the outer bin 13*a* and the partition 13*b* of the dust collecting bin 12 are sealingly coupled with each other with the first sealing member 35 interposed therebetween. In the present disclosure, the first sealing member 35 is illustrated and explained as being disposed on the top edges of the outer bin 13*a* and the partition 13*b* of the dust collecting bin 12, but can be disposed in the groove part 33*a* of the bottom surfaces of the outer wall 34 and the partition 34*b*, as occasion demands.

The second dust separating unit 40 is coupled on an upper surface of the cover 31 by a fixing means (not shown), such as a screw, and thus the cover 31 and the second dust separating unit 40 can be separated from each other, if necessary.

The cover 31 has an approximately D-shaped form to correspond to that of the outer bin 13*a* of the dust collecting bin 12. A dust guide 36 is configured at a rear end of the cover 31 to vertically penetrate the rear end of the cover 31. The dust guide 36 guides the dust separated by the second dust separating unit 40 into the second dust collecting chamber 15 of the outer bin 13*a*. The dust guide 36 is formed by a first and a second projection part 75 and 77 to be described later and the partition 34*b* and the rear side wall 34*a* of the outer wall 34 of the cover 31, which correspond to the partition 13*b* of the dust collecting bin 12 and the rear side wall 13*a*' of the outer bin 13*a* forming the second dust collecting chamber 15, respectively.

In addition, a guide passage 32 is formed in the cover 31. The guide passage 32 at a lower part thereof is communicated in fluid with the first dust separating chamber 24 and at an upper part thereof, is communicated in fluid with second dust separating chambers 42.

An air discharging part 33 is disposed on an undersurface of the cover 31. When the body unit 10 is coupled with the cover 31, the air discharging part 33 is projected to a certain distance into the cylinder 21 to draw in the air in the first dust separating chamber 24 of the first dust separating unit 20 and to discharge it into the guide passage 32. The air discharging part 33 may be a first grill member 33' with an inlet projected into the cylinder 21. The first grill member 33' is provided with a plurality of holes formed to filter a dust. With the first grill member 33', a relatively large, fine dust, which is present in the air to be discharged into the guide passage 32, is separated therefrom.

The second dust separating unit 40 is a multi cyclone dust-separating part, which secondarily separates dust from the air by a centrifugal force. The second dust separating unit 40 is disposed on the upper part of the cover 31, as described above. The second dust separating unit 40 is provided with a branch member 41 in fluid communication with the guide passage 32 of the cover 31, and a pair of second dust separating chambers 42 to receive the air from the branch member 41 and to second separate dust from the received air.

Figure 4:
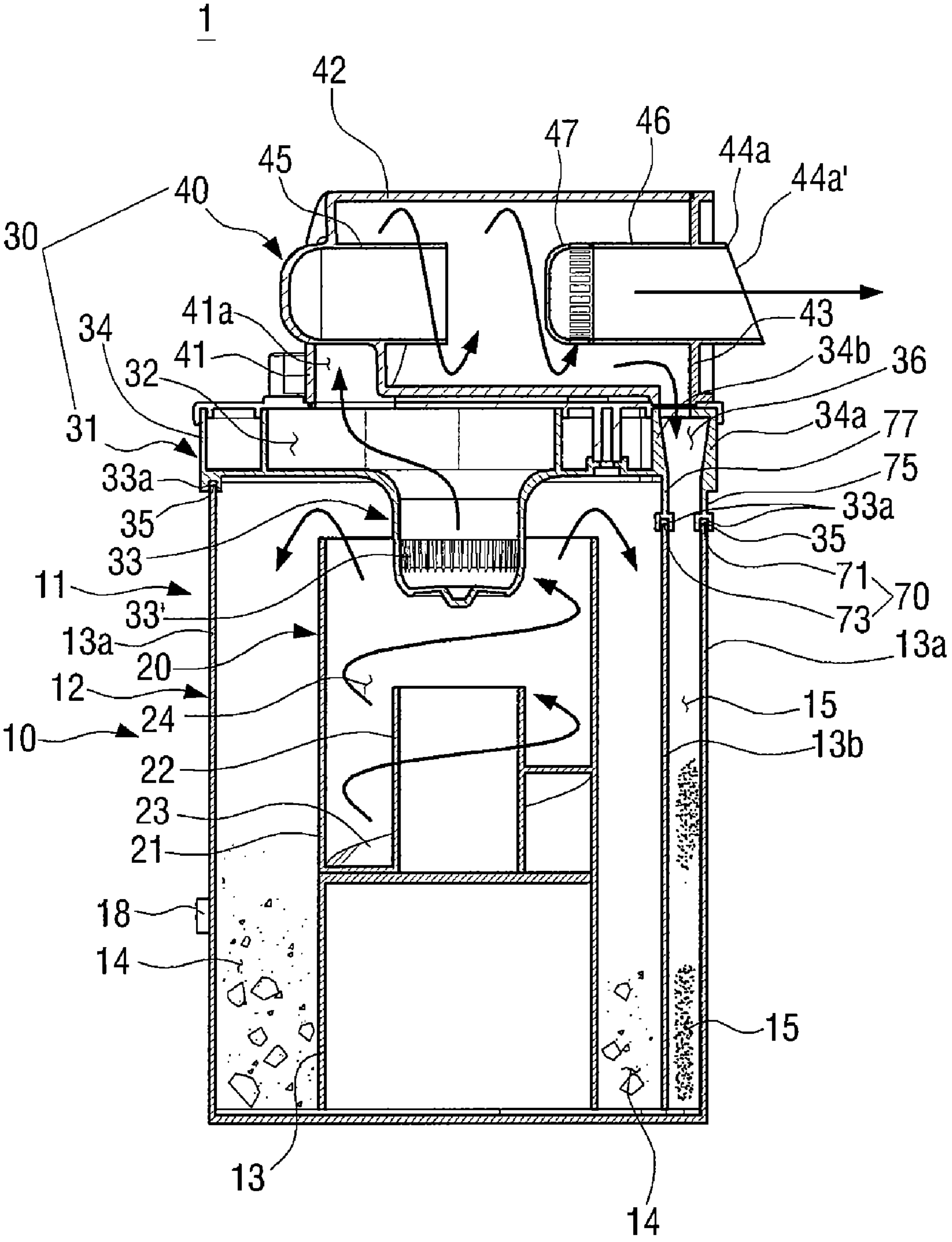
FIG. 4 is a cross-sectional view of the dust separating apparatus taken along lines IV-IV of FIG. 1.

Referring to FIGS. 1 and 4, the branch member 41 is disposed between the second dust separating chambers 42, and has a pair of inlets 41*a* arranged in parallel. Each of the inlets 41*a* at a side thereof is in fluid communication with the guide passage 32 of the cover 31, and at the other side thereof, is in fluid communication with the corresponding second dust separating chamber 42. Accordingly, the air discharged from the first dust separating chamber 24 flows into the second dust separating chambers 42 through the inlets 41*a* via the guide passage 32 of the cover 31.

Referring to FIGS. 3 and 4, each of the second dust separating chambers 42 is formed in a cylindrical shape, and has an upstream center pipe 45 and a downstream center pipe 46 disposed therein. Accordingly, the air flows into the second dust separating chambers 42 through the inlets 41 a and forms whirling currents with the help of the upstream center pipe 45 and the downstream center pipe 46, and at this time, the dust included in the air is centrifugally separated. The separated dust is then collected in the second collecting chamber 15 of the dust collecting bin 12 through the dust guide 36 of the cover 31 in fluid communication with the second dust separating chambers 42 in the vicinity of downstream parts, that is, rear ends, of the second dust separating chambers 42.

A second grill member 47 is attached on a front end of each of the downstream center pipes 46, and filters relatively small, fine dust, which is present in the air to be discharged from each of the second dust separating chambers 42. The air passes through the second grill members 47 and is discharged from the second dust separating unit 40 through a discharging part 44 conforming to rear ends of the downstream center pipes 46.

The discharging part 44 has outlets 44*a* projected from rear surfaces 43 of the second dust separating chambers 42. Like the inlet 25*a* of the air inflow part 25, each of the outlets 44*a* has an inclined edge surface 44*a*' formed at an end thereof to be slanted to the rear surface 43 of each of the second dust separating chambers 42. Like the inclined edge surface 25*a*' of the inlet 25*a*, each of the inclined edge surfaces 44*a*' may be formed, so that a distance away from the corresponding rear surface 43 is gradually increased from an upper part to a lower part thereof. Also, a third sealing member made of an elastic material is disposed on the inclined edge surfaces 44*a*'.

The outlets 44*a* are coupled with a suction motor-connecting part (not shown) disposed in the cleaner body 2, so that they are in fluid communication with a suction motor (not shown) of the cleaner body 2 when the cover unit 40 is fixed in the mounting recess of the cleaner body 2. The suction motor-connecting part, which guides the air discharged from the second dust separating chambers 42 through the outlet 44*a* toward the suction motor of the cleaner body 2, takes a shape with declined edge surfaces corresponding to the inclined edge surfaces 44*a*' of the outlets 44*a*.

In the present embodiment, the third sealing member is illustrated and explained as being disposed on the inclined edge surfaces 44*a*', but may be disposed on the corresponding declined edge surfaces of the suction motor-connecting part. Also, the outlets 44*a* and the suction motor-connecting part are illustrated and explained as having the inclined edge surfaces 44*a*' formed to be slanted, respectively, but since the cover unit 30 is installed in the cleaner body 2 in advance and thus not lifted along with the body unit 10 when the body unit 10 is mounted in the cleaner body 2, they may be configured to have a general structure, for example, non-inclined or vertical edge surfaces.

Referring to FIGS. 3 and 4, the horizontal movement-permitting part 70, is formed in the body unit 10. The horizontal movement-permitting part 70 prevents the body unit 10 from colliding with the air discharging part 33 of the cover 30 when the body unit 10 is moved in a horizontal direction and removed from or mounted in the cleaner body 2 as in case of dumping the dust collected in the dust collecting bin 12.

The horizontal movement-permitting part 70 includes a first and a second cutout parts 71 and 73 formed on upper parts of the outer bin 13*a* and the partition 13*b* of the dust collecting bin 12, respectively, in a shape to allow the grill member 33' of the air discharging part 33 to move in the horizontal direction, for example, a shape corresponding to the grill member 33' downwardly projected. The first cutout part 71 is formed on an upper part of the rear side wall 13*a*' of the outer bin 13*a* of the dust collecting bin 12, and the second cutout part 73 is formed on an upper part of the partition 13*b* of the dust collecting bin 12 forming the second dust collecting chamber 15. The first sealing member 35 is extended from the top edges of the rear side wall 13*a*' of the outer bin 13*a* and the partition 13*b* of the dust collecting bin 12, and formed on top edges of the first and the second cutout parts 71 and 73.

A depth of the first and the second cutout parts 71 and 73 cutout from the top edges of the rear side wall 13*a*' and the partition 13*b* is set to coincide with a height of a top end of the cylinder 21 of the first dust separating unit 20. To be more specific, to dump the dust collected in the dust collecting bin 12, the body unit 10 is first lowered to a certain distance in the mounting part 2*a* (see FIGS. 5A and 5B) by the lifting and lowering means explained with reference to FIGS. 5A and 5B, so that the body unit 10 is separated from the cover unit 30 by the certain distance, as shown in FIG. 6B. And then, the body unit 10 is moved in the horizontal direction (that is, a direction opposite to a direction of arrow shown in FIG. 6A) away from the cover unit 30, which remains fixed in the cleaner body 2, and is removed from the cleaner body 2. In addition, after the dust is removed from the dust collecting bin 12, the body unit 10 is mounted in the cleaner body 2 again, by first being moved in the horizontal direction toward the cover unit 30, which remains fixed in the cleaner body 2, as shown in FIG. 6A, and is positioned in the mounting part 2*a*, as shown in FIG. 6B. And then, the body unit 10 is lifted as much as the certain distance by the lifting and lowering means explained with reference to FIGS. 5A and 5B, so that it is sealingly coupled with the cover unit 30 with the first sealing member 35 interposed therebetween. Accordingly, even though the depth of the first and the second cutout parts 71 and 73 is not formed to coincide with a projected height of the first grill member 33' of the air discharging part 33 projected from the bottom surface of the cover 31 in a state where the body unit 10 and the cover unit 20 are coupled with each other, but the height of the top end of the cylinder 21 of the first dust separating unit 20, the body unit 10 can be moved in the horizontal direction without colliding with the first grill member 33' when it is mounted in or separated from the cleaner body 2 in which the cover unit 30 is fixed.

To seal the first and the second cutout parts 71 and 73 when the body unit 10 is coupled with the cover unit 30, a first and a second projection part 75 and 77 are formed on a lower part of the cover unit 30 in a shape to correspond to that of the first and the second cutout parts 71 and 73. The first and the second projection part 75 and 77 are formed on and project downward from the rear side wall 34*a* of the outer wall 34 and the partition 34*b* of the cover 31 corresponding to the rear side wall 13*a*' of the outer bin 13*a* and the partition 13*b* of the dust collecting bin 12, respectively.

As described above, the dust separating apparatus 1 according to the exemplary embodiment of the present disclosure has the horizontal movement-permitting part 70 capable of allowing one of the body unit 10 and the cover unit 30 to move in the horizontal direction with respect to the other and, thus to separate or couple the body unit 10 and the cover unit 30 from or with each other. Accordingly, when the dust collected in the dust collecting bin 12 of the dust collecting unit 11 is to be dumped, it is not necessary to separate the entire dust separating apparatus 1 from the cleaner body 2, but to separate only the body unit 10 including the dust collecting unit 11 and the first dust separating unit 20 from the cleaner body 2 while the cover unit 30 including the second dust collecting unit 40 is maintained in a state fixed in the cleaner body 2. Thus, the dumping work can be accomplished by a simple action of separating only the body unit 10 from the cleaner body 2, dumping the dust from the first and the second dust collecting chambers 14 and 15 of the dust collecting bin 12 and then mounting the body unit 10 in the cleaner body 2 again.

In addition, the dust separating apparatus 1 according to the exemplary embodiment of the present disclosure is configured, so that the first sealing member 35 is disposed between the cover unit 30 and the dust collecting bin 12 of the dust collecting unit 11. Accordingly, when the cover unit 30 is coupled with the dust collecting bin 12, the cover unit 30 and the dust collecting bin 12 can maintain the tight seal therebetween.

Also, the dust separating apparatus 1 according to the exemplary embodiment of the present disclosure is configured, so that the inlet 25*a* of the air inflow part 25, which draws the air into the first dust separating unit 20, has the inclined edge surface 25*a*' with the second sealing member 4. Accordingly, even though the body unit 10 is unstably arranged or wrongly positioned when installed in the cleaner body 2, the inlet 25*a* of the air inflow part 25 is cooperated with the corresponding declined edge surface formed on the dust separating apparatus-connecting part 3 of the cleaner body 2 to maintain the tight seal along with the second sealing member 4 therebetween. Thus, an air leakage between the inlet 25*a* and the dust separating apparatus-connecting part 3 is prevented, and a problem that the air suction efficiency deteriorates is prevented, and as a result, the deterioration of the dust separating efficiency is also prevented.

In the above description, although the dust separating apparatus 1 according to the exemplary embodiment of the present disclosure is illustrated and explained as being configured, so that only the body unit 10 is separated and removed from the cleaner body 2 while the cover unit 30 is fixed in the cleaner body 2, the present disclosure is not limited thereto. For example, if the dust separating apparatus 1 is applied to a vacuum cleaner in which the lifting and lowering means explained with reference to FIGS. 5A and 5B is not provided, it may be configured, so that the body unit 10 and the cover unit 30 are simultaneously separated and removed from or mounted in the cleaner body 2. Here, the cover unit 30 is not fixed in the mounting recess of the cleaner body 2 by the fixing means, such as the screw, so that it can be easily separated and removed along with the body unit 10 when the body unit 10 is removed from the cleaner body 2. Accordingly, after removed from the cleaner body 2 together, one of the body unit 10 and the cover unit 30 may be separated from or coupled with the other by moving the one up or down and at the same time, in the horizontal direction to the other.

Hereinafter, an operation of the dust separating apparatus 1 of the vacuum cleaner according to the exemplary embodiment of the present disclosure constructed as described above will be explained in detail with reference to FIG. 4.

First, air is drawn into the cleaner body 2 through the suction nozzle assembly along with a dust in the vicinity of a surface to be cleaned and flows into the first dust separating chamber 24 of the first dust separating unit 20 disposed in the outer bin 13*a* of the dust collecting bin 12, through the inlet 25*a* (see FIG. 2) of the air inflow part 25 formed on the rear side wall 33*a*' of the outer bin 13*a* of the dust collecting bin 12. The air is changed into a whirling current and ascends in the first dust separating chamber 24. At this time, relatively large dust is first separated from the air and then collected into the first dust collecting chamber 14 of the outer bin 13*a* through the opened top of the first dust separating chamber 24.

The air from which the dust is first separated passes through the first grill member 33' to filter off relatively large, fine dust therefrom again, and flows into the pair of the second dust separating chambers 42 of the second dust separating unit 40 through the branch member 41 via the guide passage 32 formed in the cover unit 30.

After that, the air is moved rearward while whirling in the second dust separating chambers 42. At this time, dust is second separated from the air by the centrifugal force of the whirling current, and collected into the second dust collecting chamber 15 of the outer bin 13*a* in fluid communication with the downstream sides of the second dust separating chambers 42, via the dust guide 36.

The air from which the dust is secondarily separated flows into the downstream center pipes 46 on which the second grill members 47 is disposed, respectively. At this time, a relatively small, fine dust is filtered by the second grill members 47.

The air that flows into the downstream center pipes 46 is discharged to the suction motor of the cleaner body 2 disposed on the rear side of the dust separating apparatus 1, through the discharging part 44 formed on the rear ends of the downstream center pipes 46.

As apparent from the foregoing description, according to the exemplary embodiment of the present disclosure, the dust separating apparatus has the horizontal movement-permitting part capable of allowing one of the body unit and the cover unit to move in the horizontal direction with respect to the other. Accordingly, the dust separating apparatus is easy to move the body unit or the cover unit in the horizontal direction thus to separate or couple the body unit and the cover unit from or with each other, and to move the body unit in the horizontal direction thus to mount or remove the body unit in or from the cleaner body. For instance, if the dust separating apparatus is applied to the vacuum cleaner, so that while the cover unit is fixed in the cleaner body, only the body unit is removed from or coupled on the cleaner body, the dumping work for the dust collecting bin can be accomplished by the simple action of separating only the body unit from the cleaner body to dump the dust and then mounting the body unit in the cleaner body again. Also, if the dust separating apparatus is applied to the vacuum cleaner, so that the cover unit and the body unit are simultaneously removed from or coupled in the cleaner body, the dumping work can be accomplished by the simple action of removing the cover unit and the body unit from the cleaner body together, and moving one of the cover unit and the body unit up or down and at the same time, in the horizontal direction to the other thus to separate or couple the cover unit and the body unit from or with each other. In this case, the separation and coupling between the cover unit and the body unit may come more easy, as compared with that of the conventional dust separating apparatus of only long moving one of the cover unit and the body unit up or down to the other thus to separate or couple the cover unit and the body unit from or with each other.

In addition, the dust separating apparatus according to the exemplary embodiment of the present disclosure is configured, so that the first sealing member is disposed between the cover unit and the dust collecting bin. Accordingly, when the cover unit is coupled with the dust collecting bin, the cover unit and the dust collecting bin can maintain the tight seal therebetween.

Also, the dust separating apparatus according to the exemplary embodiment of the present disclosure is configured, so that the air inflow part, which draws in the air into the first dust separating unit, has the inclined edge surface with the second sealing member. Accordingly, even though the dust separating apparatus is unstably arranged or wrongly positioned when installed in the cleaner body, the air inflow part is cooperated with the corresponding declined edge surface formed on the dust separating apparatus-connecting part of the cleaner body to maintain the tight seal along with the dust separating apparatus-connecting part therebetween. Thus, the air leakage between the air inflow part and the dust separating apparatus-connecting part is prevented, and the problem that the air suction efficiency is deteriorated is prevented, and as a result, the deterioration of the dust separating efficiency is prevented.

Although representative embodiment of the present disclosure has been shown and described in order to exemplify the principle of the present disclosure, the present disclosure is not limited to the specific embodiment. It will be understood that various modifications and changes can be made by one skilled in the art without departing from the spirit and scope of the disclosure as defined by the appended claims. Therefore, it shall be considered that such modifications, changes and equivalents thereof are all included within the scope of the present disclosure.

What is claimed is:

1. A dust separating apparatus of a vacuum cleaner, comprising:

a body unit to separate dust from air and to store the dust separated from the air;

a cover unit detachably coupled with the body unit and having an air discharging part with an inlet projected into the body unit; and a horizontal movement-permitting part formed in the body unit to prevent the body unit from colliding with the air discharging part when one of the body unit and the cover unit is moved in a horizontal direction with respect to the other.

2. The apparatus as claimed in claim 1, wherein the body unit comprises:

at least one first dust separating unit to separate the dust from the air; and a dust collecting bin to store the dust separated from the air by the at least one first dust separating unit.

3. The apparatus as claimed in claim 2, wherein the at least one first dust separating unit comprises a single cyclone dust-separating part disposed in the dust collecting bin.

4. The apparatus as claimed in claim 2, wherein the air discharging part comprises a grill member projected into the at least one first dust separating unit when the body unit and the cover unit are coupled with each other.

5. The apparatus as claimed in claim 1, wherein the horizontal movement-permitting part comprises a cutout part formed on an upper part of the body unit in a shape to allow the air discharging part to pass through the upper part of the body unit when the one of the body unit and the cover unit are moved in the horizontal direction with respect to one another.

6. The apparatus as claimed in claim 5, wherein the cover unit comprises a projection part formed in a shape to correspond to the cutout part so as to seal the cutout part when the cover unit is coupled with the body unit.

7. The apparatus as claimed in claim 6, wherein the cutout part and the projection part are formed on rear side walls of the body unit and the cover unit, respectively.

8. The apparatus as claimed in claim 1, wherein the cover unit is detachably fixable to a cleaner body, so that the cover unit is maintained in a fixed state in the cleaner body when the body unit is separated and removed from the cover unit.

9. The apparatus as claimed in claim 2, wherein the cover unit further comprises a second dust separating unit to further separate dust from the air discharged through the air discharging part.

10. The apparatus as claimed in claim 9, wherein the cover unit comprises a guide passage to guide the air discharged through the air discharging part into the second dust separating unit.

11. The apparatus as claimed in claim 9, wherein the second dust separating unit comprises a multi cyclone dust-separating part disposed on an upper part of the cover part.

12. The apparatus as claimed in claim 9, wherein the dust collecting bin comprises:

a first dust collecting chamber to store the dust separated by the at least one first dust separating unit; and a second collecting chamber isolated from the first dust collecting chamber by a partition to store the dust separated by the second dust separating unit.

13. The apparatus as claimed in claim 12, wherein the horizontal movement-permitting part comprises a first cutout part and a second cutout part formed on the partition and an outer side wall of the dust collecting bin forming the second collecting chamber, respectively, the first and second cutout parts having a shape to allow the air discharging part to pass through the partition and the outer side wall of the dust collecting bin when the one of the body unit and the cover unit are moved in the horizontal direction with respect to one another.

14. The apparatus as claimed in claim 13, wherein the cover unit comprises a first projection part and a second projection part formed on a partition and an outer side wall of the cover unit corresponding to the partition and the outer side wall of the dust collecting bin, the first and second projection parts having in a shape to correspond to the first and the second cutout parts.

15. The apparatus as claimed in claim 14, wherein the partition and the outer side wall of the cover unit and the first and the second projection parts form a dust guide to guide the dust separated by and discharged from the second dust separating unit into the second dust collecting chamber when the dust collecting bin of the body unit is coupled with the cover unit.

16. The apparatus as claimed in claim 2, further comprising first sealing member disposed on one of a lower part of the cover unit and an upper part of the dust collecting bin, the first sealing member sealing between the cover unit and the dust collecting bin when the cover unit is coupled with the dust collecting bin.

17. The apparatus as claimed in claim 3, wherein the dust collecting bin comprises an air inflow part connected to the at least one first dust separating unit while passing through the dust collecting bin and having an end projected outward from an outer wall of the dust collecting bin.

18. The apparatus as claimed in claim 17, wherein the air inflow part has an inclined edge surface formed at the end thereof.

19. The apparatus as claimed in claim 18, wherein the inclined edge surface is formed, so that a distance away from the dust collecting bin is gradually increased from an upper part to a lower part thereof.

20. The apparatus as claimed in claim 19, wherein the inclined edge surface has a second sealing member disposed thereon.

* * * * *